US007526772B2

(12) United States Patent
Childress et al.

(10) Patent No.: US 7,526,772 B2
(45) Date of Patent: Apr. 28, 2009

(54) METHOD AND APPARATUS FOR TRANSFORMING SYSTEMS MANAGEMENT NATIVE EVENT FORMATS TO ENABLE CORRELATION

(75) Inventors: Rhonda L. Childress, Austin, TX (US); Catherine Helen Crawford, Carmel, NY (US); David Bruce Kumhyr, Austin, TX (US); Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 10/758,858

(22) Filed: Jan. 16, 2004

(65) Prior Publication Data

US 2005/0160134 A1 Jul. 21, 2005

(51) Int. Cl.
*G06F 13/00* (2006.01)
(52) U.S. Cl. ........................ 719/318; 719/311; 709/223; 709/224
(58) Field of Classification Search ................. 719/311, 719/318; 709/223, 224
See application file for complete search history.

(56) References Cited

U.S. PATENT DOCUMENTS

| 5,991,806 | A  | * | 11/1999 | McHann, Jr. ................. 709/224 |
| 6,480,901 | B1 | * | 11/2002 | Weber et al. ................. 709/246 |
| 6,871,224 | B1 | * | 3/2005  | Chu et al. .................... 709/224 |
| 2003/0028577 | A1 | * | 2/2003 | Dorland et al. ............. 709/100 |
| 2003/0050983 | A1 | * | 3/2003 | Johnson ...................... 709/206 |
| 2005/0102382 | A1 | * | 5/2005 | MacGregor et al. ......... 709/223 |

\* cited by examiner

*Primary Examiner*—Andy Ho
(74) *Attorney, Agent, or Firm*—Yee & Associates, P.C.; Jeffrey S. LaBaw

(57) ABSTRACT

A method, apparatus, and computer instructions for system management. A gateway in a network data processing system receives an event in a native event management form. The event is transformed into a new format. The event is correlated in the new format to determine whether a system management action should be performed.

21 Claims, 3 Drawing Sheets

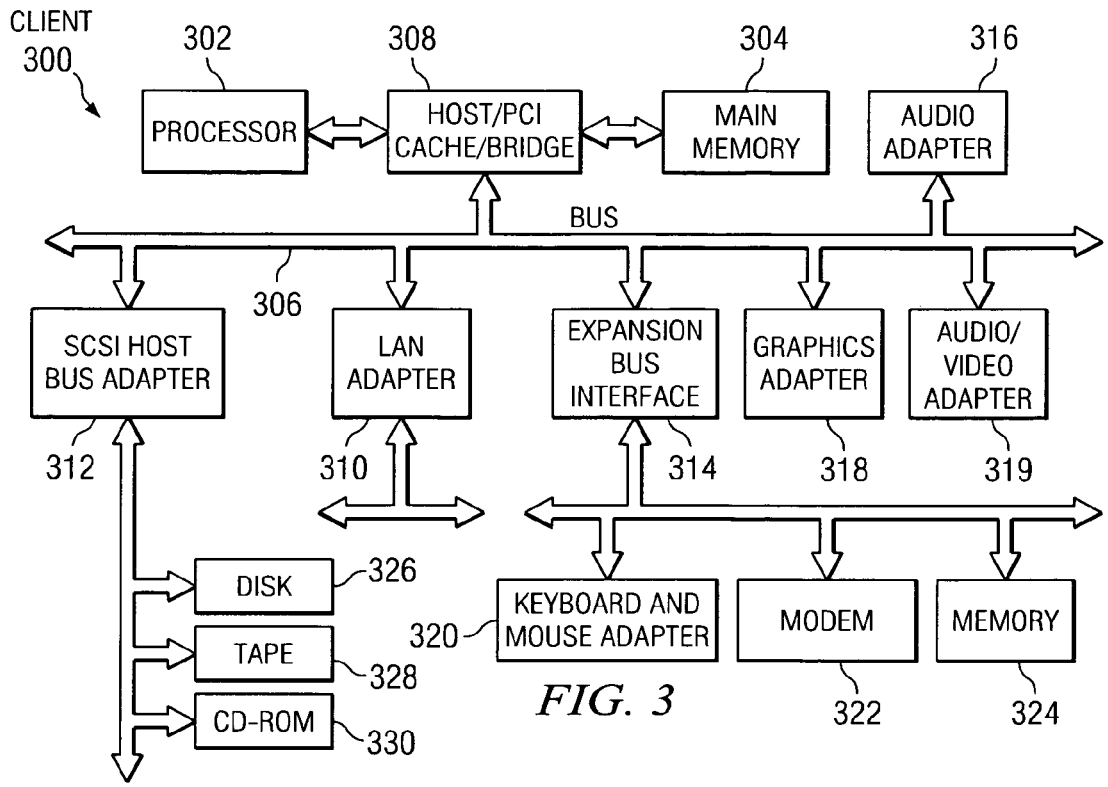
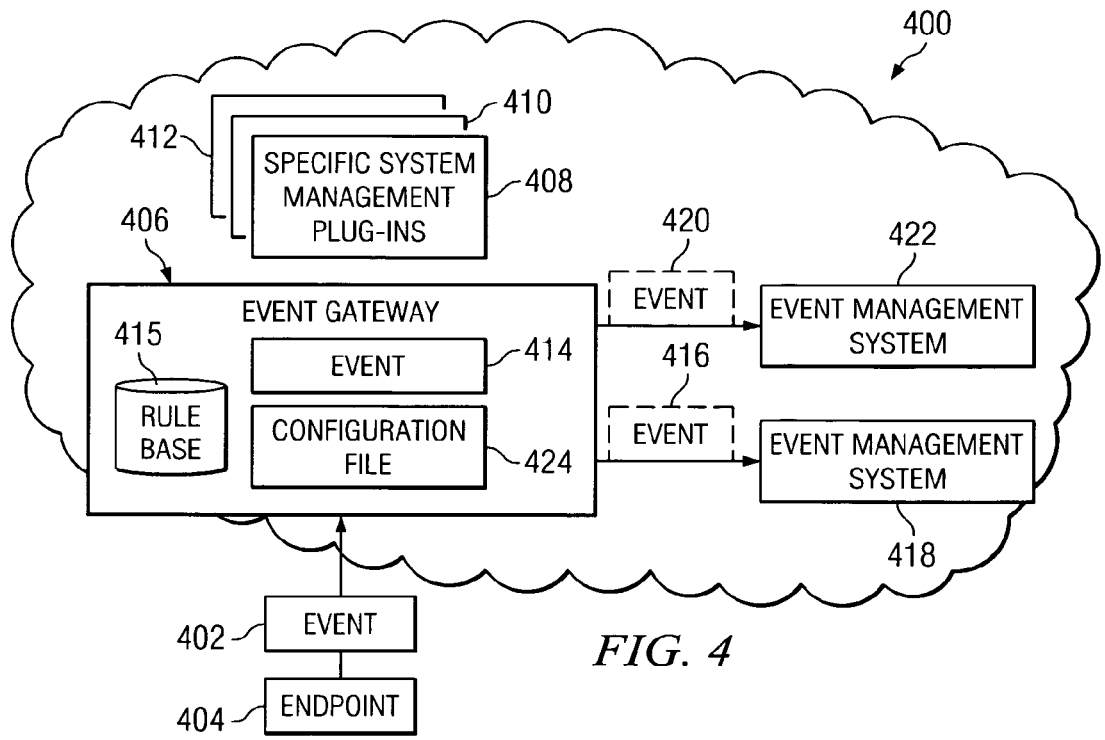

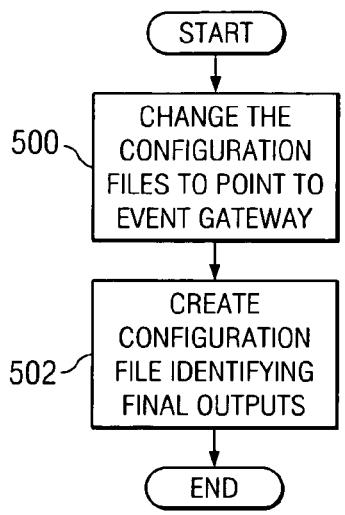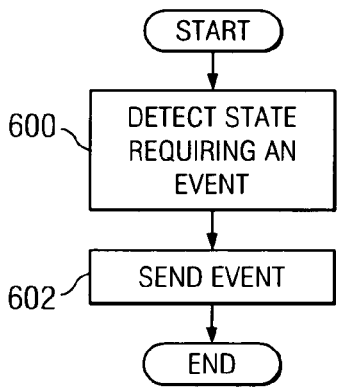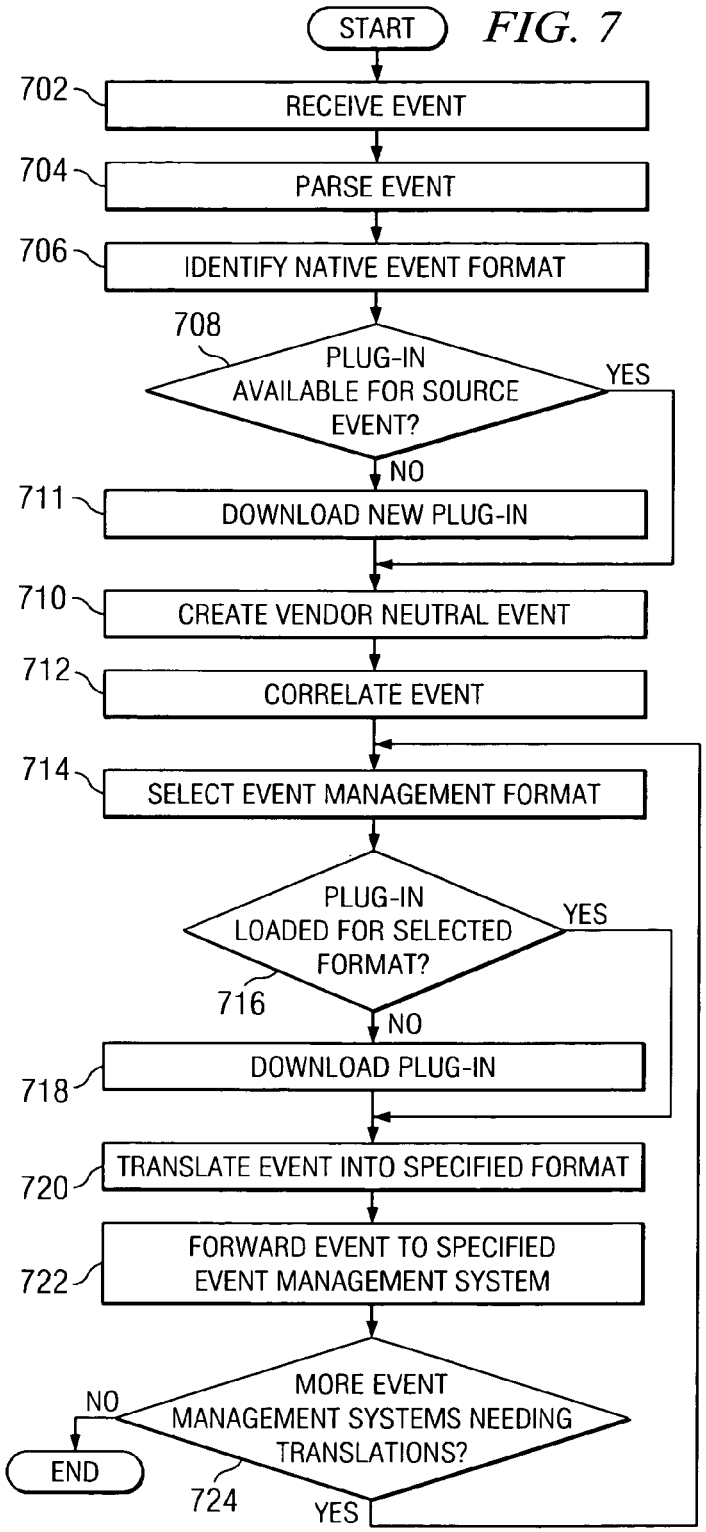

METHOD AND APPARATUS FOR TRANSFORMING SYSTEMS MANAGEMENT NATIVE EVENT FORMATS TO ENABLE CORRELATION

BACKGROUND OF THE INVENTION

1. Technical Field

The present invention relates generally to an improved data processing system and in particular to a method and apparatus for handling events. Still more particularly, the present invention relates to a method, apparatus, and computer instructions for translating events into a format for correlation.

2. Description of Related Art

Currently, many customer network data processing systems employ correlation and automation solutions to aide in analyzing complex business environments implemented in their network data processing systems. These correlation and automation solutions are employed to consolidate and correlate event data or cross network systems to quickly and accurately identify the true root cause of a problem. Once the root cause is determined, processes or actions may be taken to adjust, fix, reconfigure, or provision resources to solve the problem. These correlation and automation solutions are also referred to as customer system management solutions. Typically, a vendor specific product is provided to perform actions for given products. These vendor specific products use proprietary systems for detecting, generating and handling event data. When a customer looks for a newer customer system management product, these vendor specific products typically require a replacement or a replacement strategy to change vendors. In many cases, a customer will choose to stay with the same vendor in order to avoid the costly replacement of software. This can be true even in merger and acquisitions type situations, resulting in different parts of the company using different system management software so that it becomes very difficult for information technology (IT) department of the company to manage. To compound the situation, many customers are using vendor specific formats for event management to notify them when an alert must be raised instead of utilizing open standards for performance reasons. As a result, vendors may be entrenched with the customer because the cost to change applications makes this change prohibitive. As a result, many customers do not change or move to a different event management system even though such a system may provide better performance.

Therefore, it would be advantageous to have an improved method, apparatus, and computer instructions for allowing an event management system to work with a vendor specific format used to generate event data.

SUMMARY OF THE INVENTION

The present invention provides a method, apparatus, and computer instructions for system management. A gateway in a network data processing system receives an event in a native event management form. The event is transformed into a new format. The event is correlated in the new format to determine whether a system management action should be performed or these events can be forwarded to another event management system for correlation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a diagram illustrating components used in transforming a native event format into another format to allow for correlations in accordance with the preferred embodiment of the present invention;

FIG. 5 is a diagram illustrating setup processes for an event management system to transform native event formats to a desired format in accordance with the preferred embodiment of the present invention;

FIG. 6 is a flowchart of a process for generating an event in accordance with the preferred embodiment of the present invention; and FIG. 7 is a flowchart of a process for handling events perceived from an endpoint in accordance with the preferred embodiment of the present invention.

DETAILED DESCRIPTION OF THE PREFERRED EMBODIMENT

Figure 1:
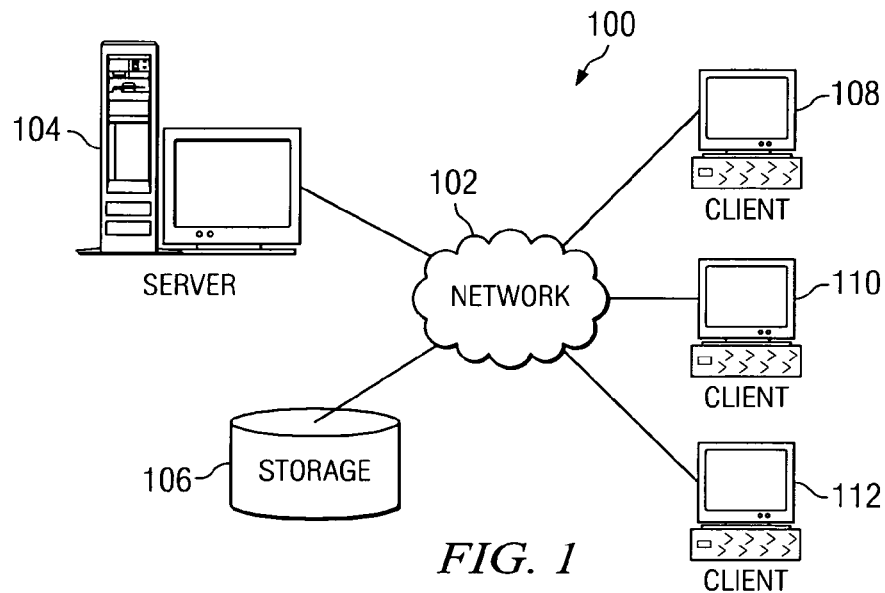
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
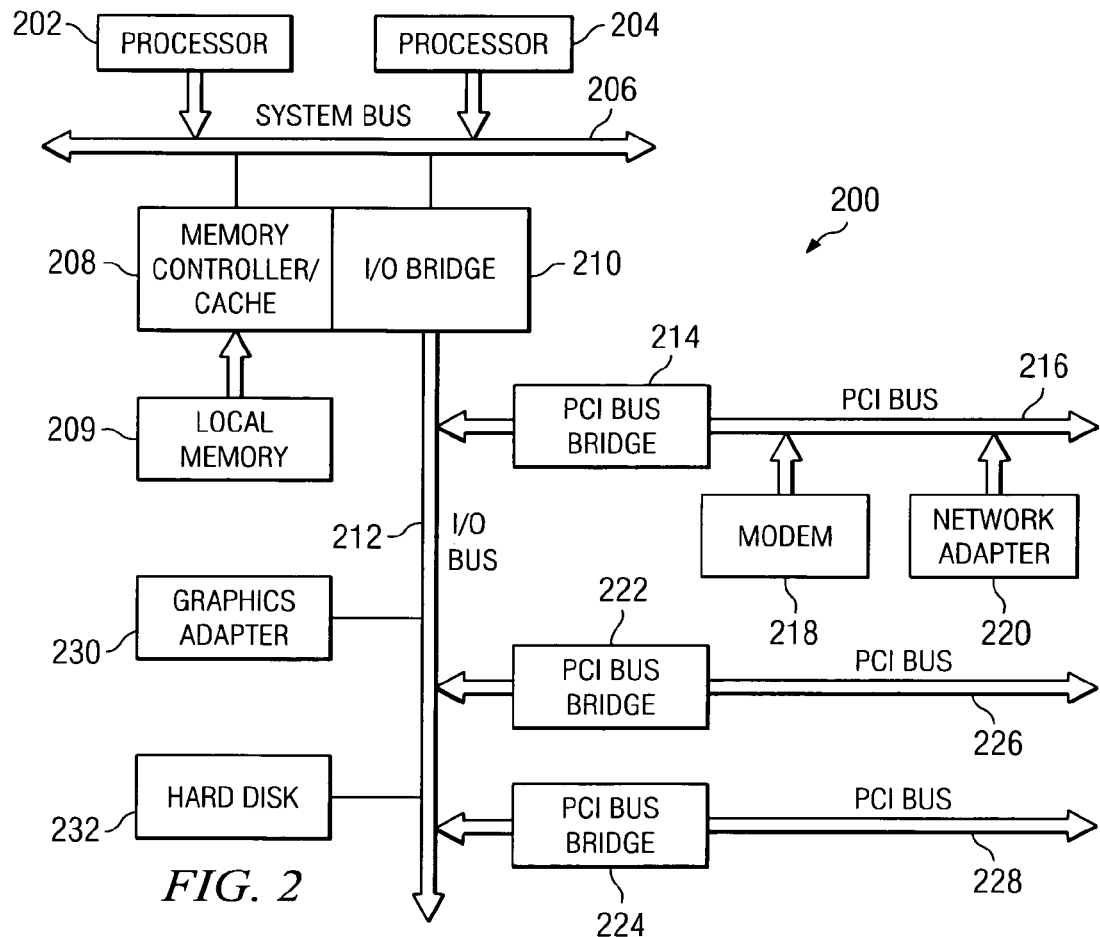
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provideslan interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer, a personal digital assistant (PDA), or a hand held computer. Data processing system 300 also may be a kiosk or a Web appliance.

The present invention provides an improved method, apparatus and computer instructions for managing events generated in a native format. A native format is the format that is already in use within a management system, such as IBM Tivoli monitoring. Events are generated by endpoints, such as work stations, routers, switches, or other devices in response to some state or occurrence at the end points. The events are generated by software on the endpoints or a proxy for the endpoint. The mechanism of the present invention provides a node, such as a gateway, to transform the event in the native format into a different format, such as that for another vendor, a neutral format, or an open standard. The formats differ depending on the particular system. For example, some formats may be keyword based, while other formats may be value based for particular fields. In this manner, the mechanism of the present invention allows a closed system to communicate with another closed system or interact with an open standard solution. Additionally, the mechanism of the present invention takes the transformed format and correlates these events to determine whether management actions are required.

Specifically, a gateway architecture is implemented in which application programming interfaces (APIs) and plug-ins are employed to describe event data management. The events enter the system in a native event management format, are translated into a neutral format and optionally correlated within the gateway architecture. If the gateway is to be used for a strict translation mechanism, the translation to a neutral format may be avoided. As used herein, "correlating" an event involves analyzing or processing the event to generated a decision. The correlating of the event may involve comparing the received event with other previously received events. The correlating relation also may identify a cause for the event. The correlation also may involve comparing an event or a set of events to a policy or a set of rules. In correlating events, a determination may be made as to whether events are system wide or local. This type of correlating may involve event annihilation, which involves determining whether conflicting events are present. For example, a number of events may indicate that a server cannot be reached or "pinged", while a second set of events may indicate that a router is out of service. These two types of events may be correlated in a positive correlation to identify a root cause as to why a server cannot be reached. This decision may be, for example, performing a system management action. This action may be, for example, setting a response program to respond to the event, such as restarting a database, and/or sending a notification to an administrator. The action also may be to correlate the event or identify a root cause for the event. For example, the root cause as why the database server is unreachable is because the network routers in front of the server are down. Another example of an action is opening a trouble ticket.

Alternatively, the event in the native event management format may be translated into a format used in a specific event management system located in the gateway and correlated in that system. This correlation within the gateway is used in one illustrative embodiment of the present invention. Also, the mechanism of the present invention allows for the translation of the event in a native format for a specific event management system that may be remotely located from the gateway. Once translated, it may forward that translated event to the remote specific event management system. Further, the event may be translated into multiple event formats and respective translations (possibly more than one translation per system) sent to other systems.

The mechanism of the present invention employs plug-ins for inputs and outputs to the gateways. The translations may be performed by translating events to existing standards, such as Web services or portable operating system interface for Unix (POSIX). In the gateway, a state table is employed to keep all of the events so that events may be correlated. The mechanism allows a management system to register a single event or cross many types of systems with respect to translations and correlations.

Turning next to FIG. 4, a diagram illustrating components used in transforming a native event format into another format to allow for correlations is depicted in accordance with the preferred embodiment of the present invention. As illustrated, event management system 400 may receive an event, such as event 402 from an endpoint, such as endpoint 404. Endpoints may take various forms, such as, for example, a server computer, a client computer, a router, a switch, a network printer, or some other device that is found in a network data processing system. Event 402 is received by event gateway 406. This event gateway includes processes for transforming event 402 from a native format into a desired format. An event may include, for example, a server is down, a router is down, or an application is having difficulty processing requests. These transformations are accomplished using system management plug-ins 408, 410, and 412. Only three plug-ins are shown for purposes of illustration. Of course, other numbers of plug-ins may be used depending on the different target formats. Event gateway 406 may be implemented using a program, such as IBM Tivoli Enterprise Console (TEC), as a base and adding functionality as described herein. This program is available from International Business Machines Corporation. TEC may be used in an event gateway to provide automated problem diagnosis and resolution to improve system performance. The mechanism of the present invention adds additional processes to transform events from a native format into a desired format for analysis. In these illustrated examples, the processes are implemented in plug-ins, such as plug-ins 408, 410, and 412.

When event 402 is received at event gateway 406, event 402 is examined to identify the native event format of event 402. The gateway formats are built into event gateway 406. These formats are defined as part of a configuration file. An administrator or user may define the plug-ins that are available. In particular, an id checker process is used to identify the native event format. This process may, for example, perform a fanning tree search.

Based on this identification, event gateway 406 determines whether a plug-in, such as specific management system plug-in 408, 410, or 412 is available for processing event 402. This determination can be made on the basis of the identified event, event type or endpoint type. If a suitable plug-in is available, in one preferred embodiment, a vendor neutral event, such as event 414, is created by event gateway 406 using a selected plug-in. Thereafter, correlation of event 406 may be performed by event gateway 406.

The correlation is provided through the use of rule base 415 in event gateway 406. This rule base contains event class definitions and rule sets. The rules in rule base 415 are used to process events. A rule is made up of a set of logic statements and is used to make decisions on what to do with an event, such as event 414 based on the information provided in the event. An event may include information, such as, for example, an event class, an event name, a severity, a location, and a description. This type of information is information typically provided in an IBM Tivoli Enterprise Console.

If event 402 is to be sent to a remote event management system, the vendor neutral form of event 402, event 414, is transformed into an event system format used by the remote event management system such as that found in event 416. Event 416 is then sent to a target management system, such as event management system 418. Further, event 414 may be transformed into multiple event formats and sent to additional event management systems. In this example, event 420 is generated from event 414. Event 420 is in yet another event management system format and sent to event management system 422. In a service provider model, such as when one company shares responsibility for a system with another company, an event may be sent to multiple event management systems. For example, if the first company has responsibility for the operating system and the second company has responsibility for the application, an event may be sent to the event management system for the first company and to the event management system for the second company. In such a case, the event may be received in SMS format, or multiple formats. From SMS, this event may then be translated into a format for both event management systems because neither party trusts the other party to correctly correlate the event.

These transformations are provided through specific system management plug-ins 408, 410, and 412. In the case that the particular plug-in for a required format is missing, that missing plug-in may be downloaded from a vendor, such as a vendor providing event gateway 406. These plug-ins perform the translations based on configuration file 424, which is located in gateway 406. This configuration file identifies the output format for events in response to receiving a particular event from an endpoint. The translations by the plug-ins may be performed using existing standards such as Web Services and POSIX as described above.

Further, internal to gateway 406 is a state table that keeps all of the events such that the events may be correlated. The state table maintains information on the events that have been processed. This information includes, for example, the name of the event, the time stamp, the state of the event (received, correlated, processed, posted, etc.), and a list of possible states that the event could be in for the next processing step. This information is the key to determining if duplicate events, canceling events, or root cause events have been processed. When identified, such events are normally not forwarded to a correlation engine for processing.

Event management systems may be registered with one or more gateways through a configuration file in these illustrative examples for a single event or across many types of systems.

Turning next to FIG. 5, a diagram illustrating setup processes for an event management system to transform native event formats to a desired format is depicted in accordance with the preferred embodiment of the present invention. Configuration files are changed on the endpoints to point to the event gateway (step 500). Additionally, another configuration file is created to identify the final outputs at the gateway (step 502) with the process terminating thereafter. One configuration file is changed while the other is created to avoid going to the "real system" to avoid spoofing the real system and the security issues created by this situation. The "real system" in this example is located in a Tivoli management environment, such as TEC. In other words, the "real system" is the event management system that is in use. Typically, when monitoring is set up, a definition of where the events are to be sent is made. If there is an existing TEC in the environment, the events should be sent to the event management gateway and not the TEC. This is the reason that the configuration file created in step 502 is created on the gateway. This provisioning of configuration files may be performed by a network administrator.

With reference next to FIG. 6, a flowchart of a process for generating an event is depicted in accordance with the preferred embodiment of the present invention. The process illustrated in FIG. 6 may be implemented in an endpoint, such as endpoint 404 in FIG. 4.

The process begins by detecting a state requiring generation of an event (step 600). An event may be generated when, for example, an application is not running, a data processing system is out of disk space, or an application is not responding to a query. Next, the event is sent to the gateway (step 602) with the process terminating thereafter.

With reference now to FIG. 7, a flowchart of a process for handling events received from an endpoint is depicted in accordance with the preferred embodiment of the present invention. The process illustrated in FIG. 7 may be implemented in a gateway, such as event gateway 406 in FIG. 4.

The process begins by receiving an event is received from an endpoint (step 702). Next, the event is parsed (step 704) and the content is examined to identify the native event format (step 706). A determination is then made as to whether a plug-in is available for the source event based on the native event formats (step 708).

If a plug-in is available, a vendor neutral event is created using the plug-in (step 710). With reference again to step 708, if a plug-in is not available for the source event, then a new plug-in for that source event is downloaded (step 711). Thereafter, the process proceeds to step 710 as described above. Using the vendor neutral event, the event is now correlated (step 712).

Next, an event management format is selected (step 714). A determination is made as to whether a plug-in is present for the selected format. If a plug-in is not present, the plug-in is then downloaded (step 718). Thereafter, the event is translated into the specified format (step 720). This format is specified using a configuration file created for the gateway. The process also proceeds to step 720 from step 716 if the plug-in is already loaded for the specified format.

Next, the event is forwarded to the specified event management system (step 722). The event management system is identified in the configuration file for the gateway. The identification of the event management system typically takes the form of the hostname of the server or the IP address. A determination is made as to whether translations are needed for additional event management system (step 724). If no additional event management systems are present in which translations are needed, the process terminates. Otherwise, the process returns to step 714 as described above.

With reference to step 712, this step is an optional step. The event gateway may correlate the event depending on the settings in the configuration file. Example settings include y (yes) for correlation and f (forward) to forward the event. Further, if step 712 is not used, the creation of a vendor neutral event is not required. At that time, the event may be directly translated from the native format into the target event management system that is to receive the event for correlation.

Thus, the present invention provides an improved method, apparatus, and computer instructions for transforming events in a native format into a target format for allowing correlation of events. Mechanism of the present invention receives an event and transforms it into a neutral format. This neutral format may then be translated into a format for a particular event management system.

In this manner, the mechanism of the present invention may send an event to different event management systems to allow for different types of analysis and correlation. As a result, management actions that may be needed are identified in a manner in which event management systems using different formats may be used to collectively provide an analysis for a particular event. Depending on the particular implementation, the event may be correlated or analyzed in the gateway or sent only to a single event management system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for translating system events for system management, the method comprising:

receiving at a gateway in a network data processing system an event in a native event management form;

translating the event into a new format to form a translated event;

correlating the translated event in the new format to determine whether a system management action should be performed; and translating the translated event by the gateway into a plurality of different event management system formats to form a plurality of second translated events, and the plurality of second translated events are correlated at remote system management data processing systems to determine whether system management events should be performed.

2. The method of claim 1, wherein the new format is a neutral event format, and wherein the correlating is rules-based using a rule base in the gateway that comprises event class definitions and rule sets.

3. The method of claim 2, wherein the translated event that is translated by the gateway into the plurality of different event management system formats is in the neutral event format.

4. The method of claim 1, wherein the translated event is translated to the plurality of event management system formats using a configuration file located at the gateway that specifies the plurality of event management system formats, wherein the gateway services a plurality of event-generating endpoints, and wherein the gateway comprises a plurality of plug-in modules that each provide a particular type of event format translation, and wherein a particular one of the plurality of plug-in modules is selected as specified by the configuration file.

5. The method of claim 4, wherein the event is received from an endpoint, and wherein the plurality of different event management system formats are selected based on results of the correlating of the translated event, as specified by the configuration file.

6. The method of claim 5, wherein the endpoint is at least one of a server data processing system, a router, a printer, switch, or another gateway, and wherein the configuration file specifies that the event that is received is to be correlated by the gateway.

7. The method of claim 1, wherein the event that is translated into a vendor specific form is in the vendor neutral form prior to such vendor specific form translation.

8. A method for translating system events for system management, the method comprising:
   receiving at a gateway in a network data processing system an event in a native event management form;
   translating the event into a new format to form a translated event; and
   correlating the translated event in the new format by the gateway to determine whether a system management action should be performed, wherein the translated event is to be sent to a remote event management system and wherein the translating step comprises:
   translating the event from the native event management form to a vendor neutral form to form the translated event;
   translating the translated event from the vendor neutral form into a vendor specific form, which is different from the vendor neutral form, for use by the remote event management system; and
   forwarding the vendor specific form of the event to the remote event management system.

9. A data processing system for translating system events for system management, the data processing system comprising:
   a bus system;
   a communications unit connected to the bus system;
   a memory connected to the bus system, in which the memory includes a set of instructions; and
   a processing unit connected to the bus system, in which the processing unit executes the set of instructions to receive at a gateway in a network data processing system an event in a native event management form, translate the event into a new format to form a translated event, correlate the translated event in the new format to determine whether a system management action should be performed, and translate the translated event by the gateway into a plurality of different event management system formats to form a plurality of second translated events that are correlated at remote system management data processing systems to determine whether system management events should be performed.

10. A data processing system for translating system events for system management, the data processing system comprising:
    receiving means for receiving at a gateway in a network data processing system an event in a native event management form;
    translating means for translating the event into a new format to form a translated event;
    correlating means for correlating the translated event in the new format to determine whether a system management action should be performed;
    second translating means for translating the translated event by the gateway into a plurality of different event management system formats to form a plurality of second translated events; and
    sending means for sending the plurality of second translated events to a remote system management data processing systems to determine whether system management events should be performed.

11. The data processing system of claim 10, wherein the new format is a neutral event format, and wherein the means for correlating is rules-based using a rule base in the gateway that comprises event class definitions and rule sets.

12. The data processing system of claim 11, wherein the translated event that is translated by the gateway into the plurality of different event management system formats is in the neutral event format.

13. The data processing system of claim 10, wherein the translated event is translated to the plurality of event management system formats using a configuration file located at the gateway that specifies the plurality of event management system formats, wherein the gateway services a plurality of event-generating endpoints, and wherein the gateway comprises a plurality of plug-in modules that each provide a particular type of event format translation, and wherein a particular one of the plurality of plug-in modules is selected as specified by the configuration file.

14. The data processing system of claim 10, wherein the event is received from an endpoint, and wherein the plurality of different event management system formats are selected based on results of the correlating means, as specified by the configuration file.

15. The data processing system of claim 14, wherein the endpoint is at least one of a server data processing system, a router, a printer, switch, or a gateway.

16. The data processing system of claim 10, wherein the event is to be sent to a remote event management system and wherein the translating means comprises:
    first translating means for translating the event from the native event management form to a vendor neutral form; and
    second translating means for translating the event into a vendor specific form, which is different from the vendor neutral form, for use by the remote event management system.

17. A tangible computer readable medium tangibly encoded with a computer program product and operable with a data processing system for translating system events for system management, the computer program product comprising:
- first instructions for receiving at a gateway in a network data processing system an event in a native event management form;
- second instructions for translating the event into a new format to form a translated event; and
- third instructions for correlating the translated event in the new format by the gateway to determine whether a system management action should be performed, wherein the event is to be sent to a remote event management system and wherein the second instructions for translating comprises:
- first sub-instructions for translating the event from the native event management form to a vendor neutral form to form the translated event;
- second sub-instructions for translating the translated event from the vendor neutral form into a vendor specific form, which is different from the vendor neutral form, for use by the remote event management system; and
- third sub-instructions for forwarding the vendor specific form of the event to the remote event management system.

18. The computer program product of claim 17, wherein the new format is a neutral event format, and wherein the correlating is rules-based using a rule base in the gateway that comprises event class definitions and rule sets.

19. The computer program product of claim 18, wherein the translated event is correlated by the gateway if so indicated by a configuration file in the gateway.

20. The computer program product of claim 17, wherein the translated event is translated to a plurality of event management system formats using a configuration file located at the gateway that specifies the plurality of event management system formats, wherein the gateway services a plurality of event-generating endpoints, and wherein the gateway comprises a plurality of plug-in modules that each provide a particular type of event format translation, and wherein a particular one of the plurality of plug-in modules is selected as specified by the configuration file.

21. The computer program product of claim 17, wherein the event is received from an endpoint, and wherein the plurality of different event management system formats are selected based on results of the correlating of the translated event, as specified by the configuration file.

* * * * *